(12) United States Patent
Yuan et al.

(10) Patent No.: US 10,268,353 B2
(45) Date of Patent: Apr. 23, 2019

(54) METHOD AND APPARATUS FOR PROCESSING DOCKBAR AND STORAGE MEDIUM

(71) Applicant: Tencent Technology (Shenzhen) Company Limited, Shenzhen (CN)

(72) Inventors: Cancai Yuan, Shenzhen (CN); Qiong Long, Shenzhen (CN); Jintao Qiu, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 300 days.

(21) Appl. No.: 14/815,550

(22) Filed: Jul. 31, 2015

(65) Prior Publication Data

US 2015/0339048 A1    Nov. 26, 2015

Related U.S. Application Data

(63) Continuation of application No. PCT/CN2013/087544, filed on Nov. 20, 2013.

(30) Foreign Application Priority Data

Feb. 4, 2013 (CN) .......................... 2013 1 0043387

(51) Int. Cl.
*G06F 9/451* (2018.01)
*G06F 3/0484* (2013.01)
(Continued)

(52) U.S. Cl.
CPC ........ *G06F 3/04847* (2013.01); *G06F 3/0486* (2013.01); *G06F 3/04817* (2013.01); *G06F 9/4443* (2013.01); *G06F 9/451* (2018.02)

(58) Field of Classification Search
CPC ............... G06F 3/04817; G06F 3/0486; G06F 3/04847; G06F 9/4443; G06F 3/0488
See application file for complete search history.

(56) References Cited

U.S. PATENT DOCUMENTS

| | | | | |
|---|---|---|---|---|
| 7,434,177 | B1* | 10/2008 | Ording | G06F 3/04842 |
| | | | | 345/157 |
| 2007/0101297 | A1* | 5/2007 | Forstall | G06F 3/04817 |
| | | | | 715/841 |

(Continued)

FOREIGN PATENT DOCUMENTS

| | | |
|---|---|---|
| CN | 101527745 A | 9/2009 |
| CN | 102455861 A | 5/2012 |
| CN | 102855124 A | 1/2013 |

OTHER PUBLICATIONS

Tencent Technology, ISRWO, PCT/CN2013/087544, Feb. 27, 2014, 11 pgs.

(Continued)

*Primary Examiner* — Jennifer N To
*Assistant Examiner* — Amy P Hoang
(74) *Attorney, Agent, or Firm* — Morgan, Lewis & Bockius LLP

(57) ABSTRACT

The present disclosure relates to the field of information processing technologies, and discloses a method and an apparatus for processing a screen dockbar, and a storage medium. The method includes: detecting an operation of dragging an icon to a current screen dockbar on the touchscreen, the icon being an icon of an application program or an icon of a folder; determining whether the number of icons placed on the current screen dockbar reaches a preset number; and in accordance with a determination that the number of icons placed on the current screen dockbar reaches a preset number: displaying a next screen dockbar with the number of icons that does not reach a preset (Continued)

P1

P2 number; and placing the dragged icon on the next screen dockbar.

20 Claims, 16 Drawing Sheets

(51) Int. Cl.
*G06F 3/0486* (2013.01)
*G06F 3/0481* (2013.01)
*G06F 9/44* (2018.01)

(56) References Cited

U.S. PATENT DOCUMENTS

| 2007/0118813 A1* | 5/2007 | Forstall | G06F 3/0486 |
| | | | 715/805 |
| 2009/0178008 A1* | 7/2009 | Herz | G06F 3/04817 |
| | | | 715/840 |
| 2011/0061010 A1* | 3/2011 | Wasko | G06F 3/0482 |
| | | | 715/769 |

OTHER PUBLICATIONS

Tencent Technology, IPRP, PCT/CN2013/087544, Aug. 4, 2015, 6 pgs.

\* cited by examiner

METHOD AND APPARATUS FOR PROCESSING DOCKBAR AND STORAGE MEDIUM

RELATED APPLICATIONS

This patent application is a continuation application of PCT Patent Application No. PCT/CN2013/087544, entitled "METHOD AND APPARATUS FOR PROCESSING DOCKBAR, AND STORAGE MEDIUM" filed on Nov. 20, 2013, which claims priority to Chinese Patent Application No. 201310043387.4, filed by Tencent Technology (Shenzhen) Co., Ltd. on Feb. 4, 2013, and entitled "METHOD AND APPARATUS FOR PROCESSING DOCKBAR, AND STORAGE MEDIUM", both of which are incorporated by reference in their entirety.

TECHNICAL FIELD

The present disclosure relates to the field of information processing technologies, and in particular, to a method and an apparatus for processing a dockbar, and a storage medium.

BACKGROUND

With the rapid development of science and technology, intelligent mobile terminals are quickly popularized in people. Generally, in order to conveniently and quickly perform an operation such as traffic monitoring and music playback, a user may place an icon of a commonly used application program of the user on a dockbar. The dockbar may be abbreviated as a dock. Moreover, the dockbar is used as a functional interface used for starting and switching a running application program, and an application program corresponding to an icon on the dockbar may be directly entered by tapping the icon. Therefore, how to process the dockbar may have a direct impact on an application program corresponding to an icon therein.

In the existing technology, during processing of the dockbar, one screen dockbar is set on a desktop, and the number of icons that can be placed on the screen dockbar is defined. Moreover, the icons may be an icon of an application program, and may also be an icon of a folder. When the user drags an icon of the commonly used application program or folder of the user to the dockbar, if the number of icons on the dockbar at this moment does not reach the defined number, the icon dragged by the user can be successfully placed on the dockbar; and if the number of icons on the dockbar at this moment reaches the defined number, the icon dragged by the user cannot be successfully placed on the dockbar.

In the existing technology, merely one screen dockbar is set on the desktop, and the number of icons that can be placed on the dockbar is defined, so that the number of icons of application programs or folders that can be placed on the dockbar is small, and the number of running application programs that are started or switched by using the dockbar is also subject to certain limitations.

SUMMARY

In view of this, embodiments of the present disclosure provide a method and an apparatus for processing a dockbar, and a storage medium. The technical solutions are described as follows:

According to an aspect, a method for processing a dockbar is performed at a mobile terminal having one or more processors, a touchscreen, and memory for storing a plurality of program modules to be executed by the one or more processors, the method including:

detecting an operation of dragging an icon to a current screen dockbar on the touchscreen, the icon being an icon of an application program or an icon of a folder;

determining whether the number of icons placed on the current screen dockbar reaches a preset number; and in accordance with a determination that the number of icons placed on the current screen dockbar reaches a preset number: displaying a next screen dockbar with the number of icons that does not reach a preset number, and placing the dragged icon on the next screen dockbar.

According to another aspect, an mobile terminal for processing a dockbar is provided, the mobile terminal having one or more processors, a touchscreen, and memory for storing a plurality of program modules to be executed by the one or more processors, the plurality of program modules further including:

a first detection module, configured to detect an operation of dragging an icon to a current screen dockbar on the touchscreen, the icon being an icon of an application program or an icon of a folder;

a determining module, configured to determine whether the number of icons placed on the current screen dockbar reaches a preset number;

a first display module, configured to display a next screen dockbar with the number of icons that does not reach a preset number when the number of icons on the current screen dockbar reaches the preset number; and a processing module, configured to place the dragged icon detected by the first detection module on the next screen dockbar displayed by the first display module.

According to still another aspect, a non-transitory computer-readable storage medium containing one or more computer executable instructions, the computer executable instructions being executed by one or more processors of a mobile terminal having a touchscreen to perform one or more steps including:

detecting an operation of dragging an icon to a current screen dockbar on the touchscreen, the icon being an icon of an application program or an icon of a folder;

determining whether the number of icons placed on the current screen dockbar reaches a preset number; and in accordance with a determination that the number of icons placed on the current screen dockbar reaches a preset number: displaying a next screen dockbar with the number of icons that does not reach a preset number, and placing the dragged icon on the next screen dockbar.

The technical solutions provided in the embodiments of the present disclosure have the following beneficial effects:

After the number of icons on a current screen dockbar reaches a preset number, a next screen dockbar with the number of icons that does not reach the preset number is displayed, and a dragged icon is placed on the next screen dockbar with the number of icons that does not reach the preset number, thereby increasing the number of icons placed on a dockbar.

BRIEF DESCRIPTION OF THE DRAWINGS

To describe the technical solutions of the embodiments of the present disclosure more clearly, the accompanying drawings for illustrating the embodiments will be introduced briefly in the following. Certainly, the accompanying drawings in the following description show only some embodiments of the present disclosure, and a person of ordinary skill in the art may further make modifications and replacements on these accompanying drawings without creative efforts.

DESCRIPTION OF EMBODIMENTS

The following further clearly describes the technical solutions in the embodiments of the present disclosure in detail with reference to the accompanying drawings. Apparently, the described embodiments are merely a part rather than all of the embodiments of the present disclosure, and are intended to explain principles of the present disclosure instead of limiting the present disclosure to the specific embodiments. All other embodiments obtained by a person of ordinary skill in the art based on the embodiments of the present disclosure without creative efforts shall fall within the protection scope of the present disclosure.

Figure 1:
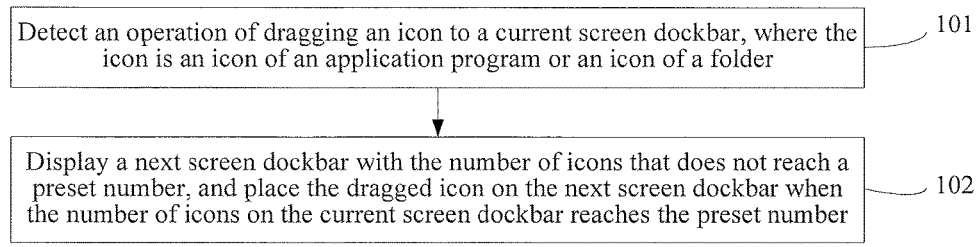
FIG. 1 is a flowchart of a method for processing a dockbar according to an embodiment of the present disclosure.

An embodiment of the present disclosure provides a method for processing a dockbar performed at a mobile terminal having a touchscreen. Referring to FIG. 1, a method process according to this embodiment includes following steps 101 and 102.

Step 101: Detect an operation of dragging an icon to a current screen dockbar on the touchscreen. The dragged icon is an icon of an application program or an icon of a folder.

Step 102: Display a next screen dockbar with the number of icons that does not reach a preset number, and place the dragged icon on the next screen dockbar if the number of icons on the current screen dockbar reaches the preset number.

The next screen dockbar is either a newly-established screen dockbar or an established screen dockbar with the number of icons that does not reach the preset number.

Further, before the displaying a next screen dockbar with the number of icons that does not reach a preset number in step 102, the method for processing a dockbar further includes:

determining whether the number of icons placed on the current screen dockbar reaches a preset number; and establishing a new screen dockbar if the numbers of icons placed on established screen dockbars all reach the preset number.

Further, the method for processing a dockbar further includes:

detecting a swipe action on the current screen dockbar, and switching from the current screen dockbar to a previous screen dockbar or a next screen dockbar of the current screen dockbar according to a swipe direction of the swipe action, where the next screen dockbar is a next screen dockbar that is next to a current screen. In other words, the touchscreen is divided into at least two regions of different but fixed sizes, one main (e.g., larger) region for the current screen and the other one (e.g., smaller) for hosting the screen dockbar. The two regions are independent from each other such that the switch of the screen dockbar from one to the other does not affect the other information displayed in the current screen.

Further, the method for processing a dockbar further includes:

displaying graphic identifiers corresponding to established screen dockbars, and after detecting that a graphic identifier corresponding to any one of the screen dockbars is tapped, switching from the current screen dockbar to a screen dockbar corresponding to the tapped graphic identifier.

Further, the method for processing a dockbar further includes:

displaying a setting option of the dockbar, and setting the dockbar according to a setting option chosen by a user after the setting option chosen by the user is received, where the setting option of the dockbar includes at least one of options of setting a size, transparency, and a background of the dockbar, the number of icons placed on the dockbar, an icon size, and an effect.

Further, the method for processing a dockbar further includes:

detecting an operation of tapping an icon on the dockbar, and directly running an application program corresponding to the tapped icon.

Further, the method for processing a dockbar further includes:

monitoring a state of the application program corresponding to the icon on the dockbar, and displaying the state of the application program by using the icon corresponding to the application program.

Therefore, in the method for processing a dockbar according to this embodiment of the present disclosure, after the number of icons on a current screen dockbar reaches a preset number, a next screen dockbar with the number of icons that does not reach the preset number is displayed, and a dragged icon is placed on the next screen dockbar with the number of icons that does not reach the preset number, thereby increasing the number of icons placed on a dockbar. Moreover, a setting option of the dockbar is displayed, which helps a user perform user-defined setting on the dockbar, and may further enrich beautification effects of the dockbar. Further, after an operation of tapping an icon is detected, an application program corresponding to the tapped icon is directly run, so that functions corresponding to the application program can be rapidly implemented, which is convenient and quick.

Figure 2:
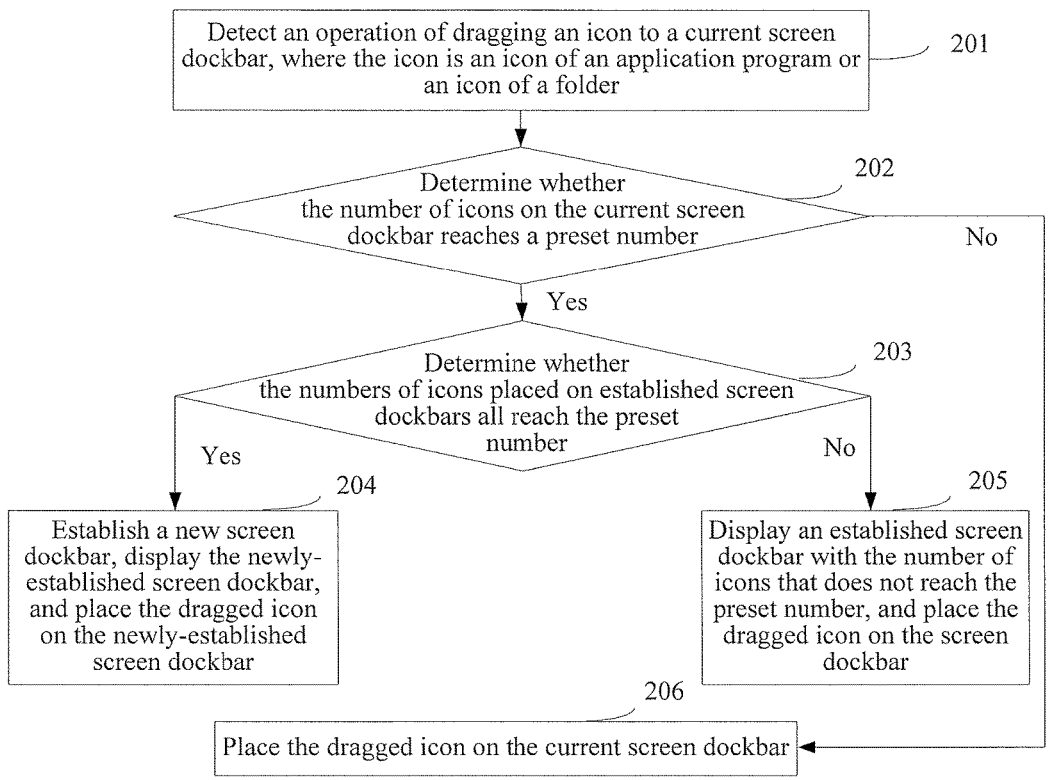
FIG. 2 is a flowchart of a method for processing a dockbar according to another embodiment of the present disclosure.

Another embodiment of the present disclosure provides a method for processing a dockbar. A manner of processing a dockbar according to this embodiment is explained in detail with reference to the content of Embodiment 1. Referring to FIG. 2, a method process according to this embodiment includes following steps 201, 202, 203, 204, 205, and 206.

Step 201: Detect an operation of dragging an icon to a current screen dockbar. The dragged icon is an icon of an application program or an icon of a folder.

Figure 3:
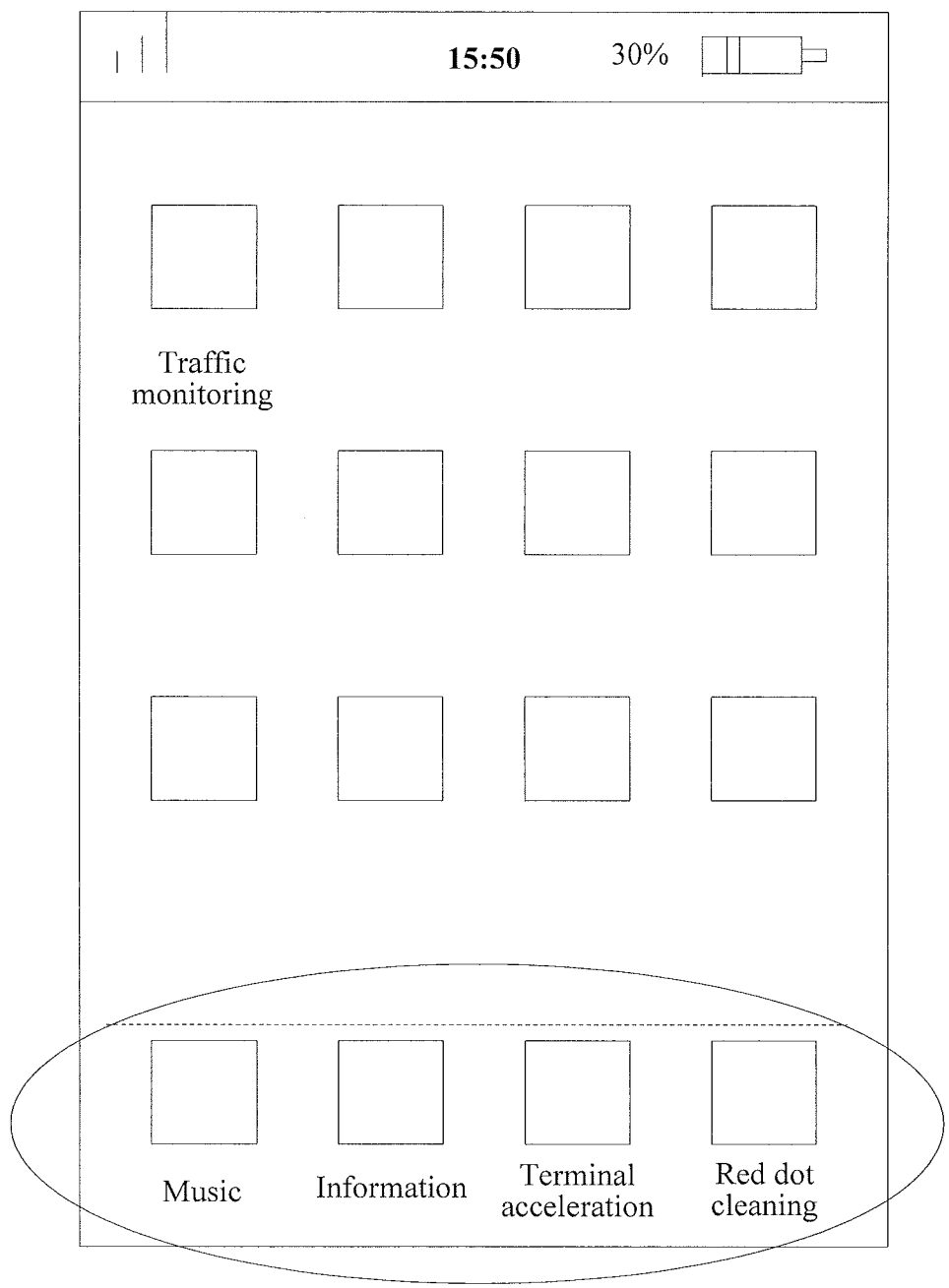
FIG. 3 is a schematic diagram of a terminal screen for displaying a dockbar according to another embodiment of the present disclosure.

For step 201, the dockbar is specifically a functional interface in a graphical user interface and used for starting and switching a running application program. A user can quickly start or switch an application program by dragging an icon of a commonly used application program of the user to the dockbar. For example, as shown in an elliptic area in FIG. 3, the icon of the commonly used application program of the user such as a music icon, an information icon, a terminal acceleration icon, and a red dot cleaning icon may be added to the dockbar while the other application icons are located outside the dockbar. When the user wants to perform a music playback operation, the user only needs to directly tap the music icon on the dockbar to implement music playback.

The step of detecting an operation of dragging an icon to a current screen dockbar includes, but is not limited to: positioning locations of icons on the current screen dockbar and a terminal screen relative to the terminal screen; then detecting in real time whether the locations of the icons relative to the terminal screen change; determining, if a location of a certain icon on the terminal screen relative to the terminal screen changes, whether a new location of the icon relative to the terminal screen is located in a location in which the current screen dockbar is located; and detecting the operation of dragging the icon to the current screen dockbar if the new location of the icon relative to the terminal screen is located in the location in which the current screen dockbar is located.

Moreover, in addition to a foregoing manner of detecting an operation of dragging an icon to a current screen dockbar, another detection manner may also be used, which is not specifically limited in this embodiment.

Step 202: Determine whether the number of icons on the current screen dockbar reaches a preset number, and perform step 203 if the number of icons on the current screen dockbar reaches the preset number, or perform step 206 if the number of icons on the current screen dockbar does not reach the preset number.

Specifically, the preset number may be set to 4. Certainly, apart from the value 4 described above, the preset number may also be another value such as 5 or 6, and this embodiment does not specifically limit the preset number.

By using that the preset number is 4 as an example, if the number of icons on the current screen dockbar is 4, the number of icons reaches the preset number, and therefore step 203 is performed; and if the number of icons on the current screen dockbar is 2, the number of icons does not reach the preset number, and therefore step 206 is performed.

Step 203: Determine whether the numbers of icons placed on established screen dockbars all reach the preset number, and perform step 204 if the numbers of icons placed on established screen dockbars all reach the preset number, or perform step 205 if the numbers of icons placed on the established screen dockbars do not reach the preset number.

For step 203, whether the numbers of icons placed on the established screen dockbars except the current screen dockbar all reach the preset number continues to be determined if the number of icons on the current screen dockbar reaches the preset number, and following step 204 is performed if the numbers of icons placed on the established screen dockbars except the current screen dockbar all reach the preset number, or step 205 is performed if the number of icons placed on an established screen dockbar except the current screen dockbar does not reach the preset number.

Specifically, a specific implementation manner of determining whether the numbers of icons placed on established screen dockbars all reach the preset number includes, but is not limited to: determining whether the numbers of icons on the established screen dockbars reach the preset number sequentially, recording determining results of the screen dockbars, and determining whether the numbers of icons placed on established screen dockbars all reach the preset number according to the determining results of the screen dockbars after the determining results of the screen dockbars are obtained.

In addition to a foregoing manner of determining whether the numbers of icons placed on established screen dockbars all reach the preset number, another determining manner may also be used, which is not specifically limited in this embodiment.

Step 204: Establish a new screen dockbar, display the newly-established screen dockbar, place the dragged icon on the newly-established screen dockbar, and end the process.

Figure 4:
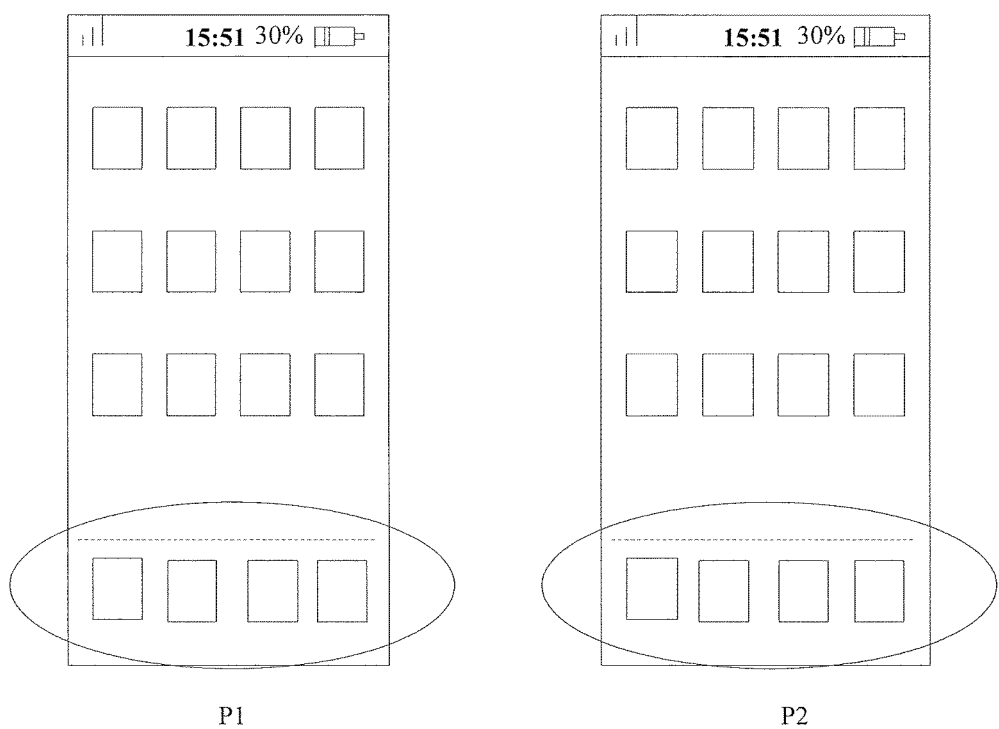
FIG. 4 is a schematic diagram of a terminal screen before a dragged icon is placed on a dockbar according to another embodiment of the present disclosure.
Figure 5:
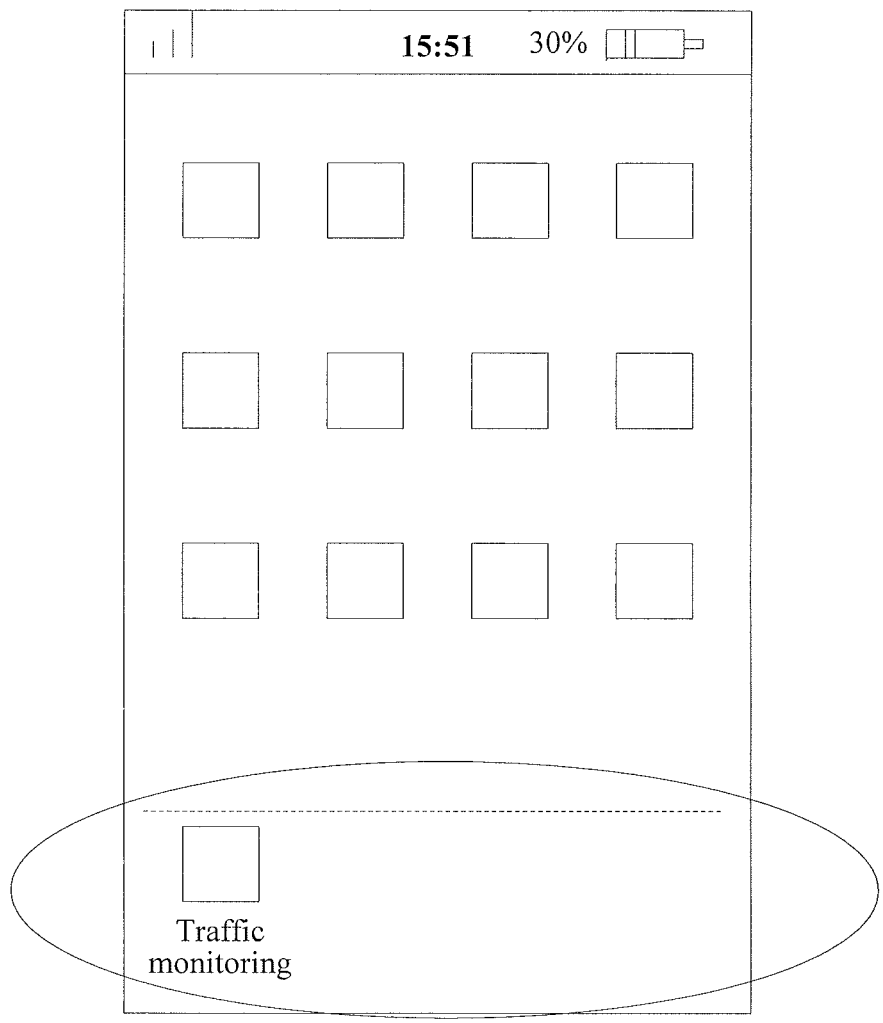
FIG. 5 is a schematic diagram of a terminal screen after a dragged icon is placed on a dockbar according to another embodiment of the present disclosure.

Specifically, as shown in an elliptic area in FIG. 4, two screen dockbars are established and the established two screen dockbars are respectively named after symbols P1 and P2; the preset number is 4; and the numbers of icons on P1 and P2 are both 4 as an example. When the user drags a traffic monitoring icon on the terminal screen of the user to the current screen dockbar, the numbers of icons on P1 and P2 are both 4 at this moment, and therefore based on that the two screen dockbars are established, a new screen dockbar is established; the newly-established screen dockbar is displayed on the terminal screen; and the traffic monitoring icon is placed on the newly-established screen dockbar. A view of the dockbar may be shown in an elliptic area in FIG. 5 after the traffic monitoring icon is placed on the dockbar.

Step 205: Display the established screen dockbar with the number of icons that does not reach the preset number, place the dragged icon on the screen dockbar, and end the process.

Figure 6:
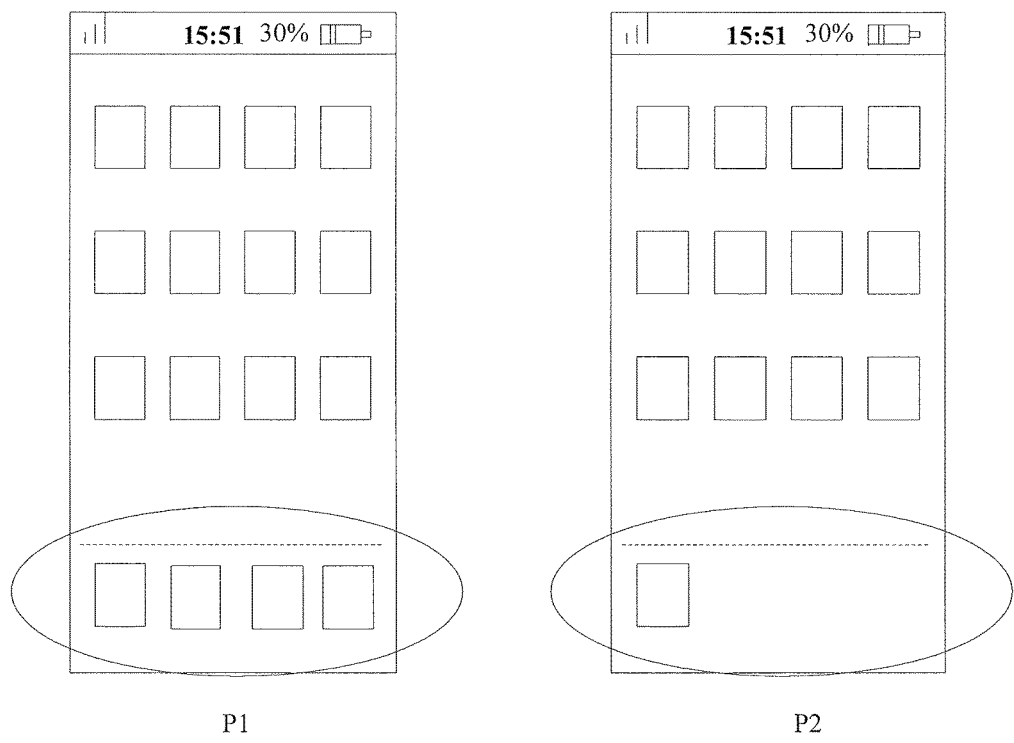
FIG. 6 is a schematic diagram of another terminal screen before a dragged icon is placed on a dockbar according to another embodiment of the present disclosure.
Figure 7:
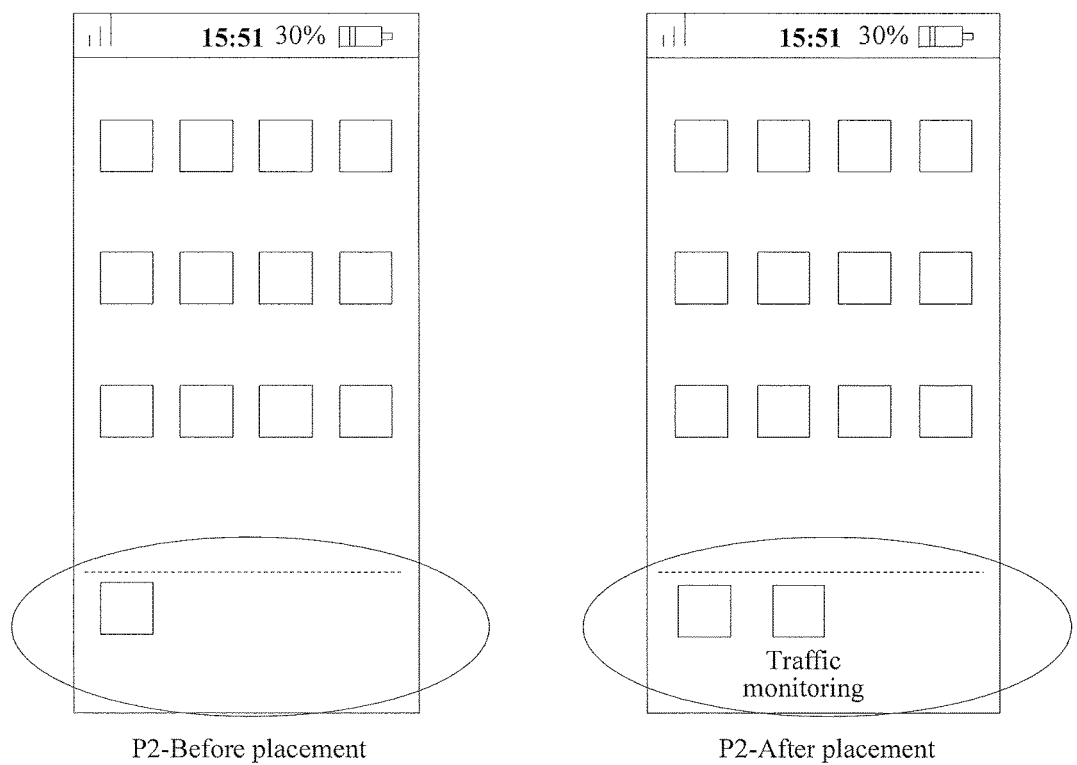
FIG. 7 is a schematic diagram of another terminal screen after a dragged icon is placed on a dockbar according to another embodiment of the present disclosure.

Specifically, as shown in an elliptic area in FIG. 6, two screen dockbars are established and the established two screen dockbars are respectively named after symbols P1 and P2; the preset number is 4; the number of icons on P1 is 4; the number of icons on P2 is 1; and P1 is the current screen dockbar as an example, if the user wants to drag the traffic monitoring icon on the terminal screen of the user to the current screen dockbar, the number of icons on P1 reaches 4 but the number of icons on P2 does not reach 4 at this moment, and therefore P2 is displayed on the terminal screen; and the traffic monitoring icon is placed on P2 and is placed behind an icon that has been placed on P2. Views of the dockbar may be shown in an elliptic area in FIG. 7 before and after the traffic monitoring icon is placed on P2.

It should be noted that, if the number of icons on the current screen dockbar reaches the preset number, the dragged icon may be placed by using steps 203 to 205 described above, and a processing process ends; and if the number of icons on the current screen dockbar does not reach the preset number, the dragged icon may be placed by using the following step, which specifically includes, but is not limited to content of following step 206.

Step 206: Place the dragged icon on the current screen dockbar, and end the process.

Specifically, by using that two screen dockbars are established; the established two screen dockbars are respectively named after symbols P1 and P2; the preset number is 4; the number of icons on P1 is 4; the number of icons on P2 is 1; and P2 is the current screen dockbar as an example, if the user wants to drag the traffic monitoring icon on the terminal screen of the user to the current screen dockbar, the number of icons on P2 does not reach 4 at this moment, and therefore the traffic monitoring icon may be directly placed on P2 and is placed behind the icon that has been placed on P2.

It should be noted that an operation of placing the dragged icon on the dockbar ends after step 201 to step 206 described above are performed. Further, in order to help the user view any one of the established dockbars, the method for processing a dockbar according to this embodiment further includes the step of switching a dockbar, which specifically includes, but is not limited to the following two manners:

The first manner is: detecting a swipe action on the current screen dockbar, and switching from the current screen dockbar to a previous screen dockbar or a next screen dockbar of the current screen dockbar according to a swipe direction of the swipe action.

For this manner, the current screen dockbar is switched to the previous screen dockbar or the next screen dockbar of the current screen dockbar according to the swipe direction of the swipe action, which may be implemented by installing a related dockbar control program in a terminal system. During specific implementation, if the dockbar control program detects that there is the swipe action on the location in which the current screen dockbar is located, the dockbar control program can control a current screen dockbar on the terminal screen to switch from a current screen to a former screen or a latter screen, and another area on the terminal screen except the dockbar may not be swiped to switch between pages with the swipe action on the current screen dockbar.

For ease of understanding, by using that the dockbar is located in the bottom of the terminal screen; the swipe action is a linear swipe operation from left to right; three screen dockbars are established and symbols are respectively P1, P2, and P3; P1 is the current screen dockbar; a previous screen dockbar of P1 is P2; and a next screen dockbar of P1 is P3 as an example, if it is detected that there is the linear swipe operation from left to right on P1, P1 is automatically switched to P2. In some embodiments, the switch of the screen dockbars does not affect the other information displayed on the touchscreen but outside the screen dockbars. In other words, the touchscreen is divided into two regions, one for the screen dockbars and the other one for the other icons, and the two regions are independently operated from each other. But the user can move an icon between the two regions.

The second manner is: displaying graphic identifiers corresponding to established screen dockbars, and after detecting that a graphic identifier corresponding to any one of the screen dockbars is tapped, switching from the current screen dockbar to a screen dockbar corresponding to the tapped graphic identifier.

Figure 8:
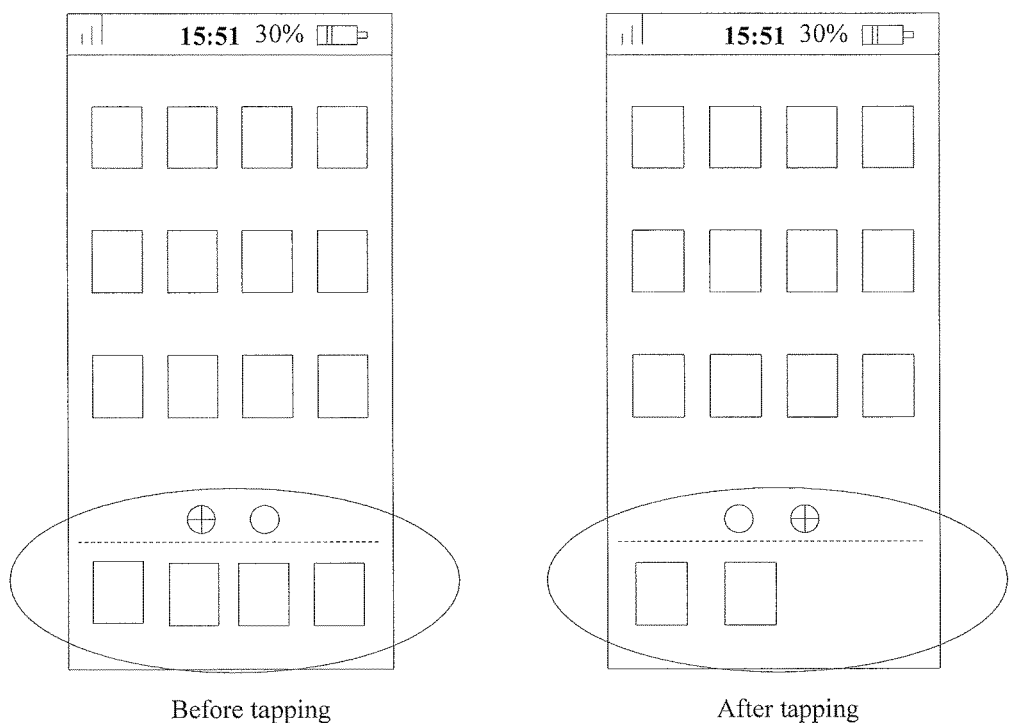
FIG. 8 is a schematic diagram of a terminal screen before and after neighboring screen dockbars are switched according to another embodiment of the present disclosure.

For this manner, after a new screen dockbar is established, a graphic identifier is set for the screen dockbar. As shown in FIG. 8, the graphic identifier may be specifically a round icon. After it is detected that the round icon corresponding to any one of the screen dockbars is tapped, the current screen dockbar is instantly switched to a screen dockbar corresponding to the tapped round icon. Moreover, in order to distinguish the tapped round icon, compared with brightness of an untapped round icon, brightness of the tapped round icon increases when the terminal screen displays the screen dockbar corresponding to the tapped round icon, so as to prompt the user that the screen dockbar currently displayed on the terminal screen is corresponding to the tapped round icon. A view of the terminal screen may be shown in FIG. 8 after detecting that the graphic identifier corresponding to any one of the screen dockbars is tapped.

Moreover, in addition to the round icon, a type of the graphic identifiers corresponding to the screen dockbars may also be a graphic identifier of another type, for example, a transverse small triangle, which is not specifically limited in this embodiment.

Further, in order to enhance visual experience of an end user and enrich beautification effects of the dockbar, the method for processing a dockbar according to this embodiment further includes the step of displaying a setting option of the dockbar and setting the dockbar according to the setting option, which specifically includes, but is not limited to the following content:

displaying the setting option of the dockbar, and setting the dockbar according to a setting option chosen by a user after the setting option chosen by the user is received, where the setting option of the dockbar includes at least one of options of setting a size, transparency, and a background of the dockbar, the number of icons placed on the dockbar, an icon size, and an effect.

For example, a size option of the dockbar may be 1/16 or 1/8 of the terminal screen, or the like; a transparency option of the dockbar may be non-transparent, 50% transparent, 100% transparent, or the like; a background option of the dockbar may implement a function of setting any image stored in a user terminal memory card to the background of the dockbar; the numbers of icons placed on the dockbar may be 4, 5, or the like; a size option of an icon placed on the dockbar may be an original size before placement, 1/2 size before placement, or the like; and the effect of the icon placed on the dockbar may be specifically that the icon presents an animation effect such as bouncing up and down, turning over, or a water cylinder to respond to a tap operation of the user when the user taps the icon.

Certainly, apart from including the options of setting the size, transparency, and the background of the dockbar, the number of icons placed on the dockbar, the icon size, and the effect, the setting option of the dockbar may further include another option, for example, a location of the dockbar relative to the terminal screen and a shape of the dockbar. This embodiment does not specifically limit content included in the setting option of the dockbar.

Further, in order to quickly run an application program corresponding to the tapped icon, the method for processing a dockbar according to this embodiment further includes the step of processing the tapped icon on the dockbar, which specifically includes, but is not limited to the following content:

detecting an operation of tapping an icon on the dockbar, and directly running the application program corresponding to the tapped icon.

The step of detecting an operation of tapping an icon on the dockbar includes, but is not limited to: acquiring a location coordinate on the terminal screen tapped by the user, and comparing the location coordinate with location coordinates of icons on the dockbar recorded before; and detecting the operation of tapping the icon on the dockbar if the location coordinate on the terminal screen tapped by the user is consistent with a location coordinate of a certain icon on the dockbar.

Figure 9:
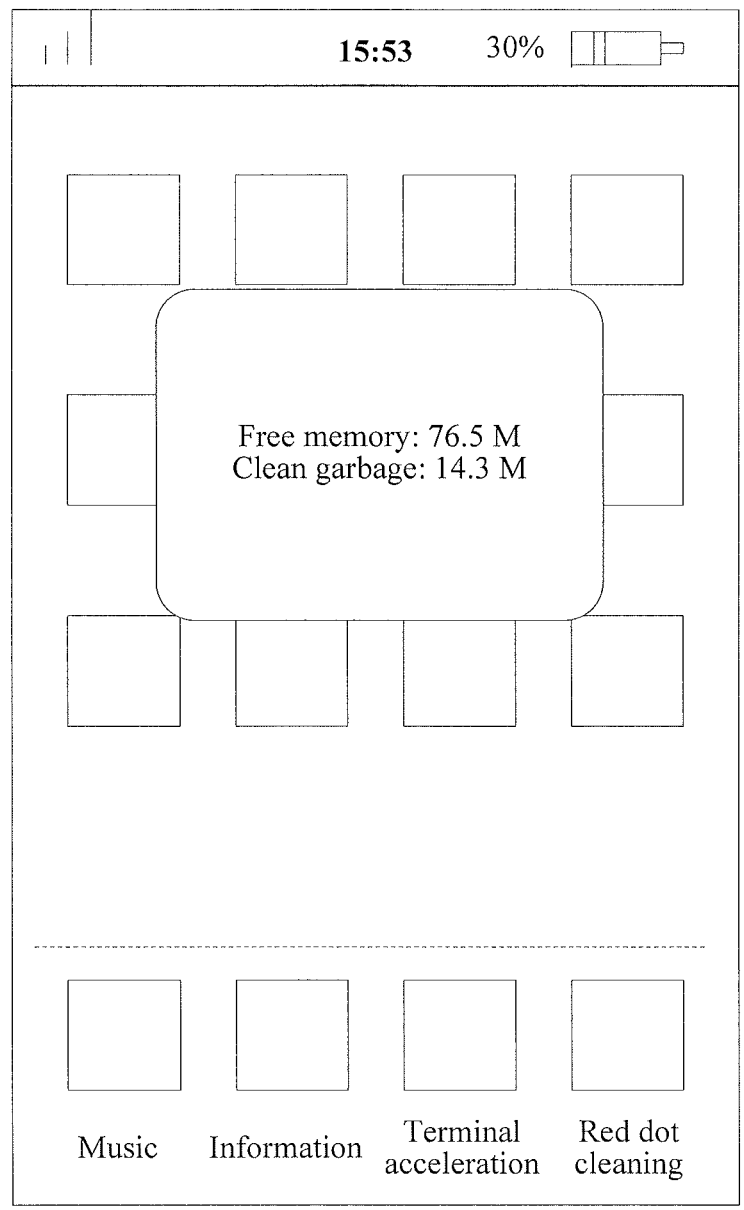
FIG. 9 is a schematic diagram of a terminal screen for displaying a final cleaning result according to another embodiment of the present disclosure.

The application program corresponding to the tapped icon may be directly run after detecting that the icon on the dockbar is tapped. For example, by using that the user wants to clean a cache file in the terminal; and the effect of the icon placed on the dockbar is set to an option of bouncing up and down as an example, the terminal acceleration icon will bounce up and down to directly run an application to clean the cache file after the user taps the terminal acceleration icon. A final cleaning result shown in FIG. 9 will be displayed on the terminal screen after cache file cleaning is finished. For example, words "free memory: 76.5 M; clean garbage: 14.3 M" are displayed in a rectangular box and automatically disappear in preset time. The preset time may be specifically 3 seconds. Certainly, apart from the value described above, the preset time may also be another value such as 2 seconds, and this embodiment does not specifically limit the preset time. Further, a specific implementation manner of displaying the final cleaning result may further be another manner. For example, the words "free memory: 76.5 M; clean garbage: 14.3 M" are displayed in a suspended balloon, and this embodiment does not specifically limit the manner of displaying the final cleaning result either.

Further, the method for processing a dockbar according to this embodiment further includes the step of monitoring a state of the application program corresponding to the icon on the dockbar and displaying the state of the application program, which specifically includes, but is not limited to the following content:

monitoring the state of the application program corresponding to the icon on the dockbar, and displaying the state of the application program by using the icon corresponding to the application program.

Figure 10:
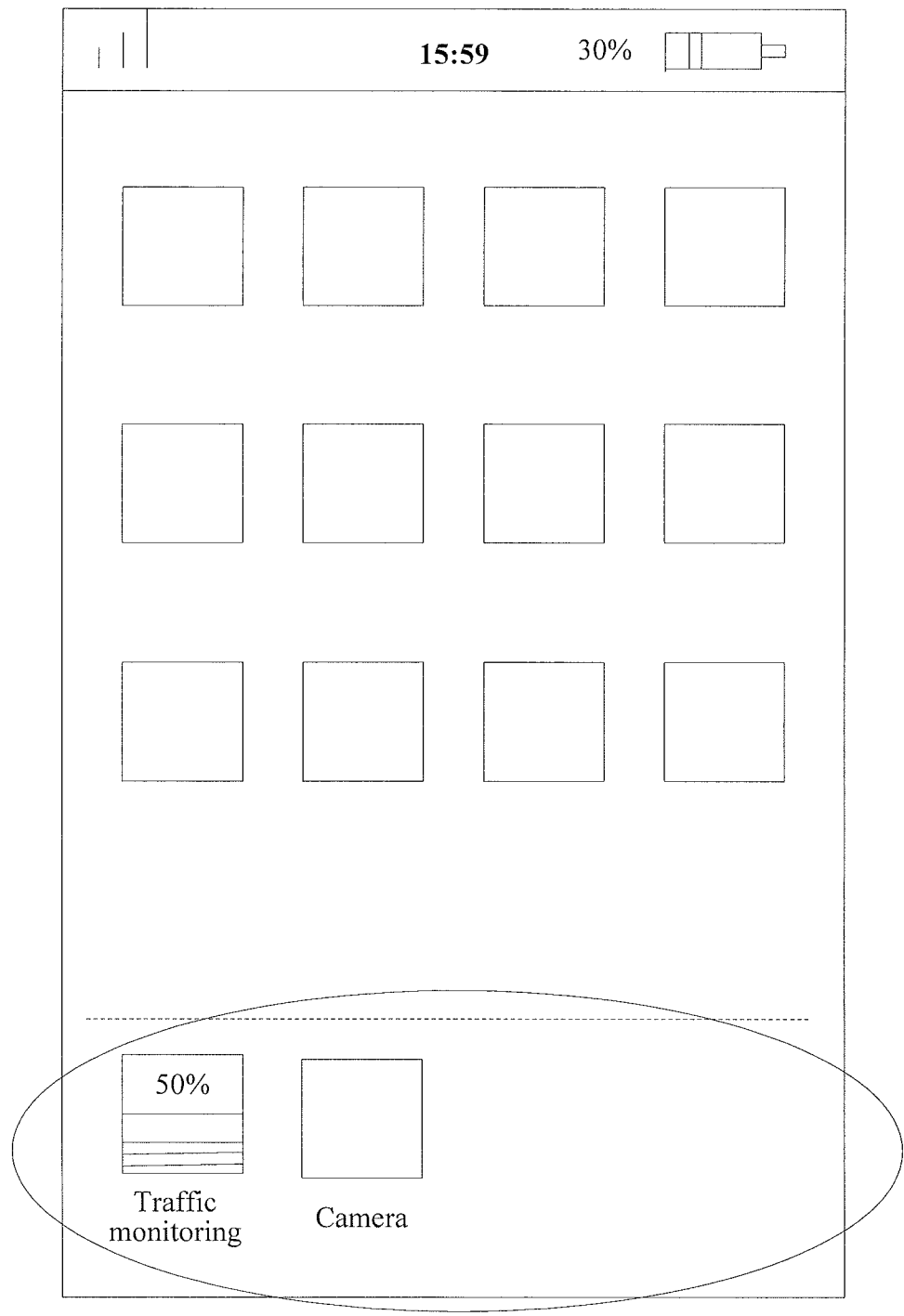
FIG. 10 is a schematic diagram of a terminal screen for displaying an effect of a digit plus a water cylinder according to another embodiment of the present disclosure.
Figure 11:
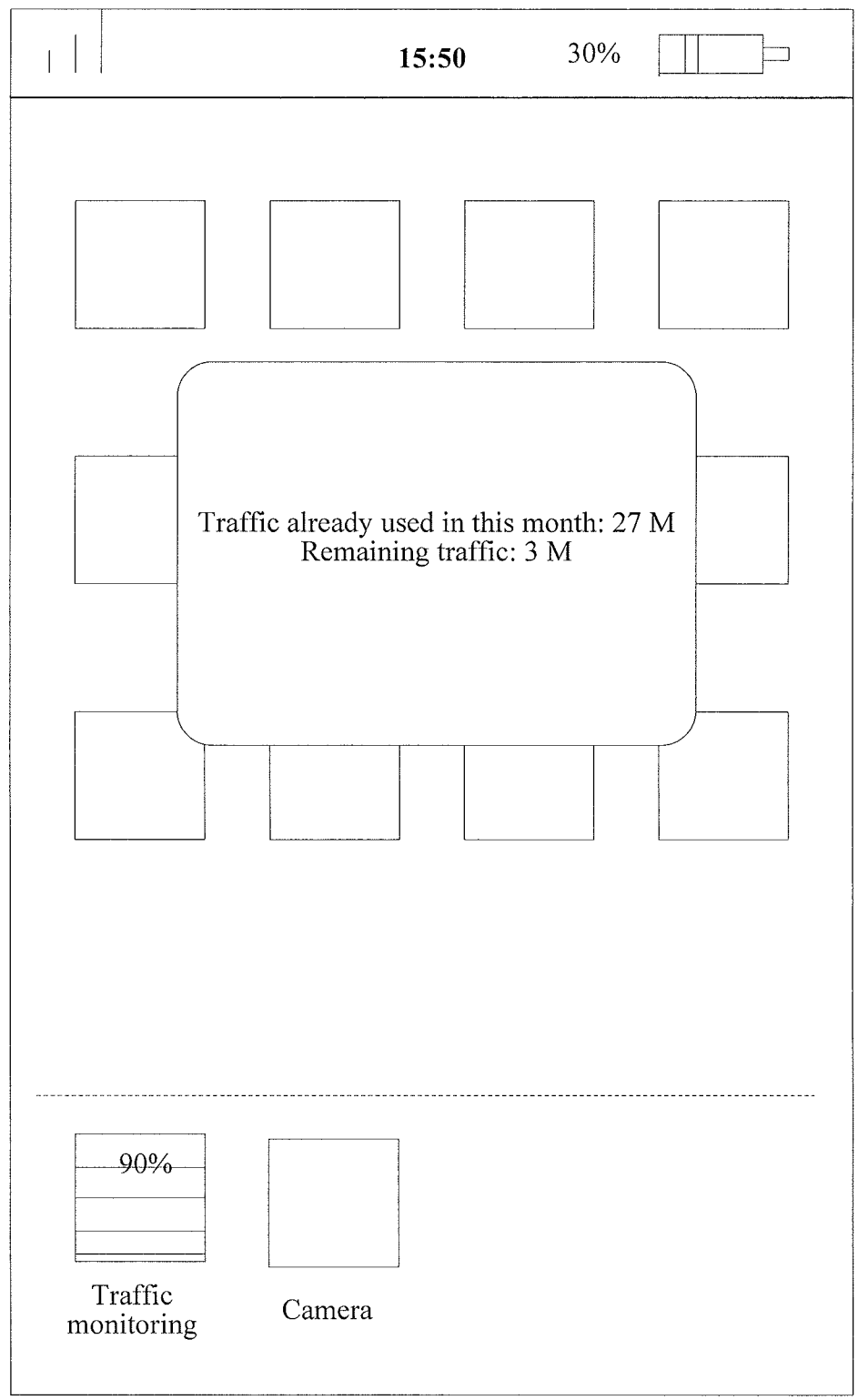
FIG. 11 is a schematic diagram of a terminal screen on which a traffic prompt window pops up according to another embodiment of the present disclosure.

For example, by using that the user sets a monthly package of 30 M in a traffic monitoring main program and taps the traffic monitoring icon as an example, a traffic usage situation of the user is monitored in real time; a current traffic usage situation of the user is counted in real time; and counted traffic usage situations are displayed on the traffic monitoring icon by means of an effect of a digit plus the water cylinder shown in an elliptic area in FIG. 10. When traffic used by the user reaches a certain proportion of traffic limited by the package, such as 90%, a prompt window shown in FIG. 11 will pop up, so as to prompt the user that traffic already used in this month will reach a package limit.

Therefore, in the method for processing a dockbar according to this embodiment of the present disclosure, after the number of icons on a current screen dockbar reaches a preset number, a next screen dockbar with the number of icons that does not reach the preset number is displayed, and a dragged icon is placed on the next screen dockbar with the number of icons that does not reach the preset number, thereby increasing the number of icons placed on a dockbar. Moreover, a setting option of the dockbar is displayed, which helps a user perform user-defined setting on the dockbar, and may further enrich beautification effects of the dockbar. Further, after an operation of tapping an icon is detected, an application program corresponding to the tapped icon is directly run, so that functions corresponding to the application program can be rapidly implemented, which is convenient and quick.

Figure 12:
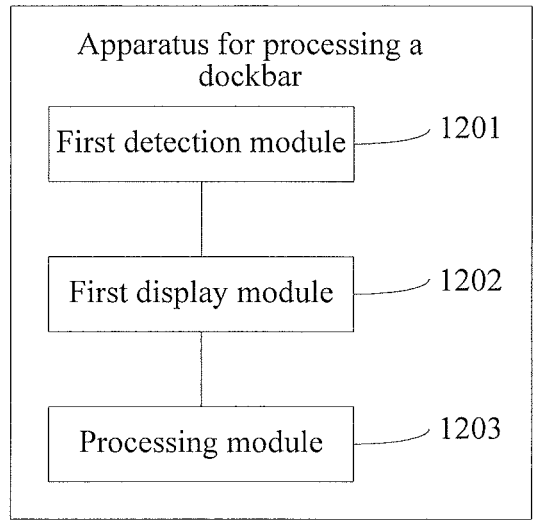
FIG. 12 is a schematic structural diagram of a first apparatus for processing a dockbar according to still another embodiment of the present disclosure.

Still another embodiment of the present disclosure provides an apparatus for processing a dockbar, and the apparatus for processing a dockbar may be configured to execute a method for processing a dockbar according to Embodiment 1 and Embodiment 2 of the present disclosure. In some embodiments, the apparatus is a mobile terminal having one or more processors, a touchscreen, and memory for storing a plurality of program modules to be executed by the one or more processors. Referring to FIG. 12, the plurality of program modules include:

a first detection module 1201, configured to detect an operation of dragging an icon to a current screen dockbar, the icon being an icon of an application program or an icon of a folder;

a first display module 1202, configured to display a next screen dockbar with the number of icons that does not reach a preset number when the number of icons on the current screen dockbar reaches the preset number; and a processing module 1203, configured to place the dragged icon detected by the first detection module 1201 on the next screen dockbar displayed by the first display module 1202.

The next screen dockbar is a newly-established screen dockbar, or the next screen dockbar is an established screen dockbar with the number of icons that does not reach the preset number.

Figure 13:
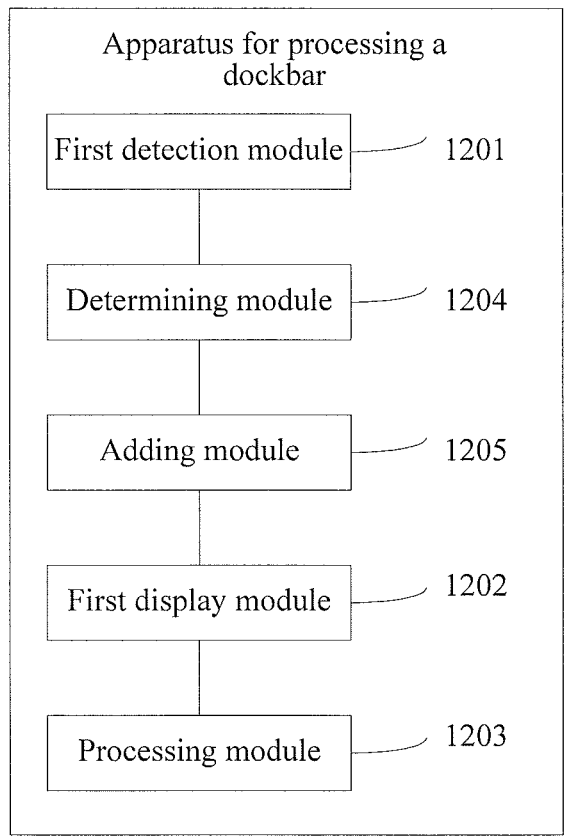
FIG. 13 is a schematic structural diagram of a second apparatus for processing a dockbar according to still another embodiment of the present disclosure.

Further, referring to FIG. 13, apart from including the first detection module 1201, the first display module 1202, and the processing module 1203, the plurality of program modules further include:

a determining module 1204, configured to determine whether the numbers of icons placed on established screen dockbars all reach the preset number; and an adding module 1205, configured to establish a new screen dockbar when the determining module 1204 determines that the numbers of icons placed on established screen dockbars all reach the preset number.

Figure 14:
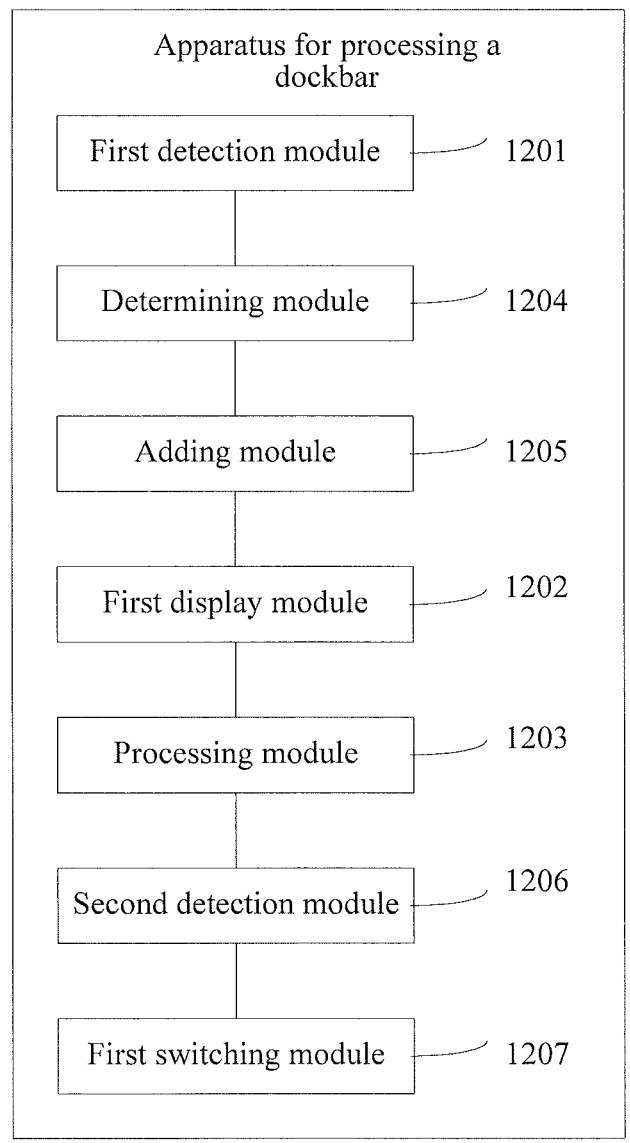
FIG. 14 is a schematic structural diagram of a third apparatus for processing a dockbar according to still another embodiment of the present disclosure.

Further, referring to FIG. 14, apart from including the first detection module 1201, the first display module 1202, the processing module 1203, the determining module 1204, and the adding module 1205, the plurality of program modules further include:

a second detection module 1206, configured to detect a swipe action on the current screen dockbar; and a first switching module 1207, configured to switch from the current screen dockbar to a previous screen dockbar or a next screen dockbar of the current screen dockbar according to a swipe direction of the swipe action detected by the second detection module 1206, where the next screen dockbar is a next screen dockbar that is next to a current screen.

It should be noted that the second detection module 1206 and the first switching module 1207 may be located in front of the first detection module 1201, and may also be located behind the processing module 1203. FIG. 14 merely provides a possible implementation manner, and this embodiment does not specifically limit locations of the second detection module 1206 and the first switching module 1207.

Figure 15:
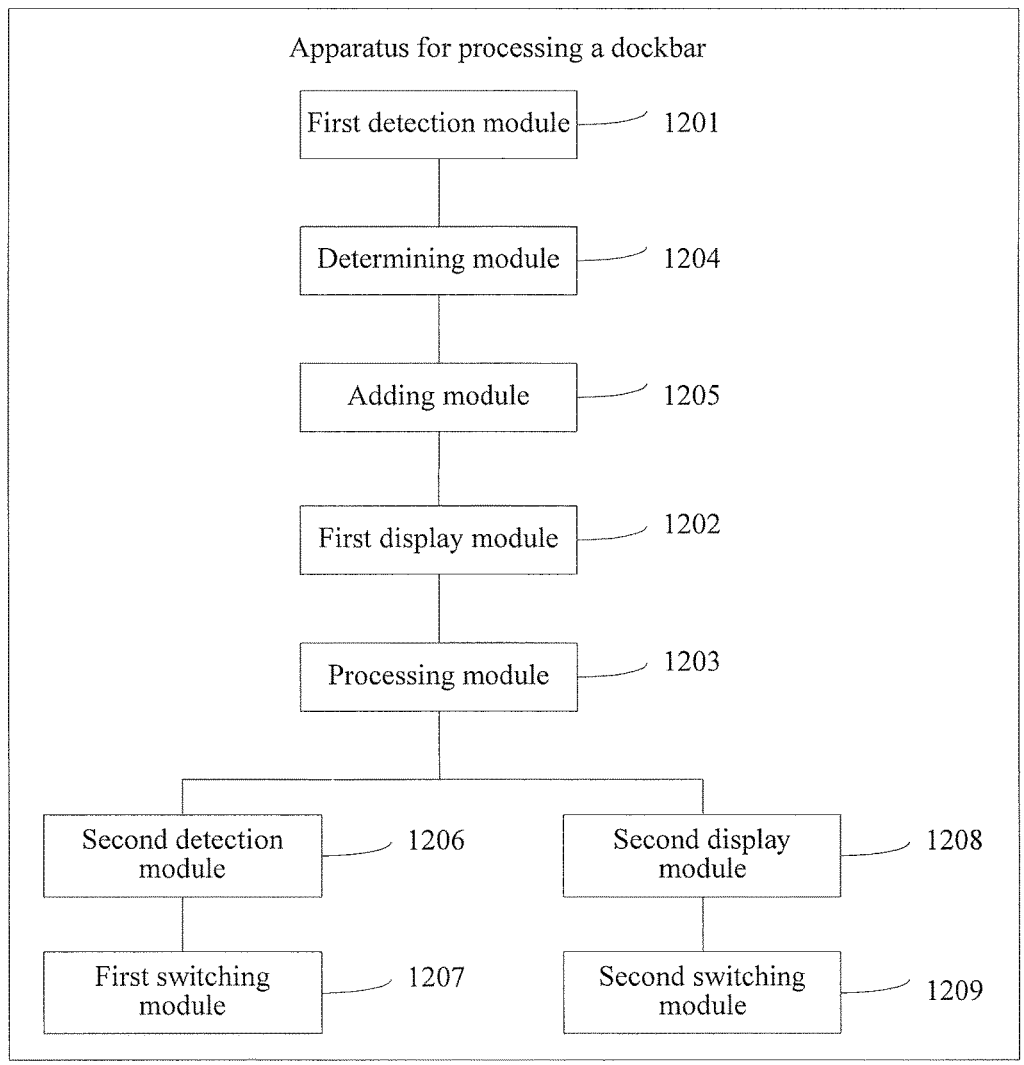
FIG. 15 is a schematic structural diagram of a fourth apparatus for processing a dockbar according to still another embodiment of the present disclosure.

Further, referring to FIG. 15, apart from including the first detection module 1201, the first display module 1202, the processing module 1203, the determining module 1204, the adding module 1205, the second detection module 1206, and the first switching module 1207, the plurality of program modules further include:

a second display module 1208, configured to display graphic identifiers corresponding to established screen dockbars; and a second switching module 1209, configured to, after detecting that a graphic identifier displayed by the second display module 1208 and corresponding to any one of the screen dockbars is tapped, switch from the current screen dockbar to a screen dockbar corresponding to the tapped graphic identifier.

It should be noted that the second display module 1208 and the second switching module 1209 may be located in front of the first detection module 1201, and may also be located behind the processing module 1203. FIG. 15 merely provides a possible implementation manner, and this embodiment does not specifically limit locations of the second display module 1208 and the second switching module 1209.

Figure 16:
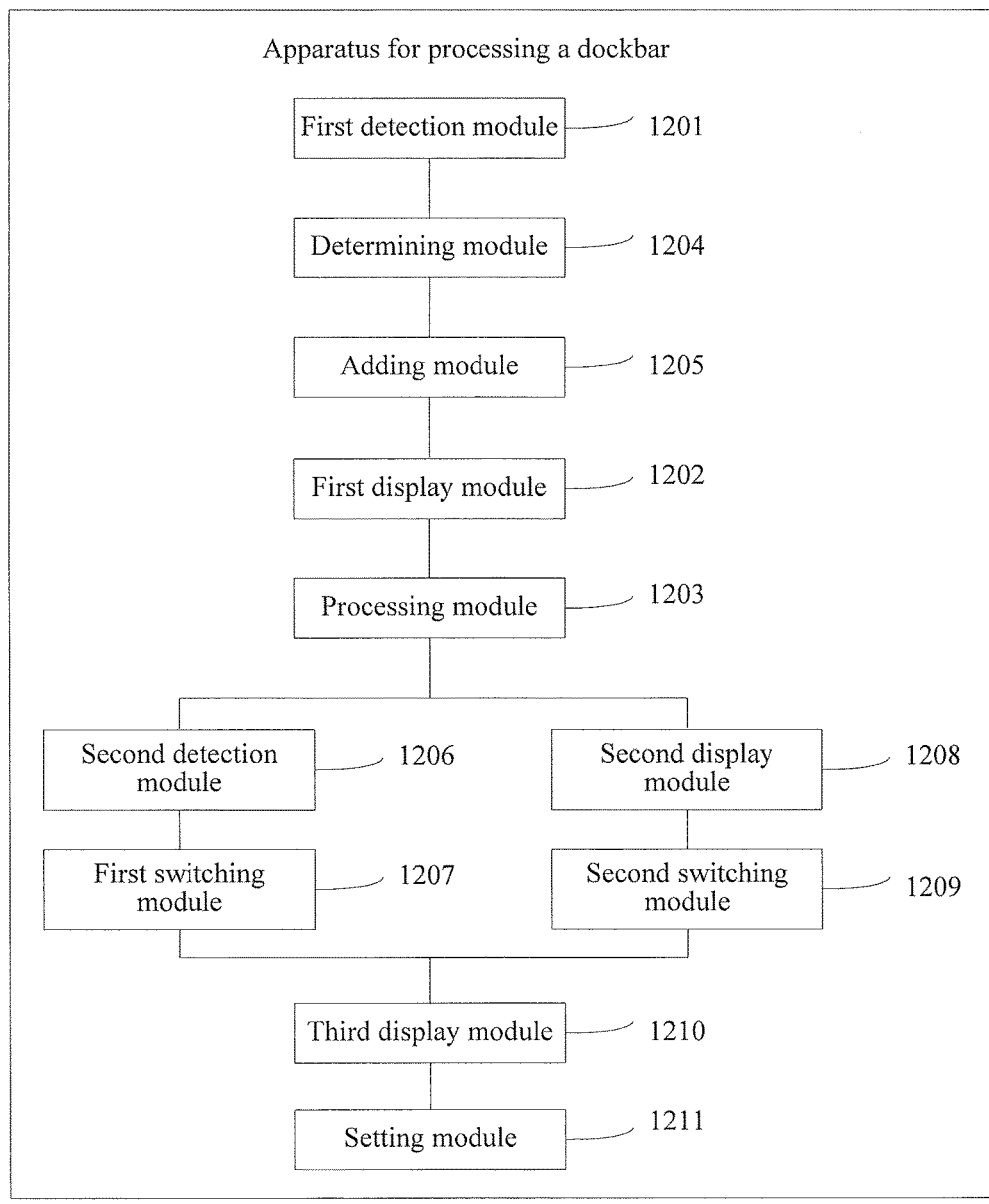
FIG. 16 is a schematic structural diagram of a fifth apparatus for processing a dockbar according to still another embodiment of the present disclosure.

Further, referring to FIG. 16, apart from including the first detection module 1201, the first display module 1202, the processing module 1203, the determining module 1204, the adding module 1205, the second detection module 1206, the first switching module 1207, the second display module 1208, and the second switching module 1209, the plurality of program modules further include:

a third display module 1210, configured to display a setting option of the dockbar; and a setting module 1211, configured to set the dockbar according to a setting option chosen by a user after the setting option chosen by the user is received, where the setting option of the dockbar includes at least one of options of setting a size, transparency, and a background of the dockbar, the number of icons placed on the dockbar, an icon size, and an effect.

It should be noted that the third display module 1210 and the setting module 1211 may be located in front of the first detection module 1201, and may also be located behind the processing module 1203 or the first switching module 1207. FIG. 16 merely provides a possible implementation manner, and this embodiment does not specifically limit locations of the third display module 1210 and the setting module 1211.

Figure 17:
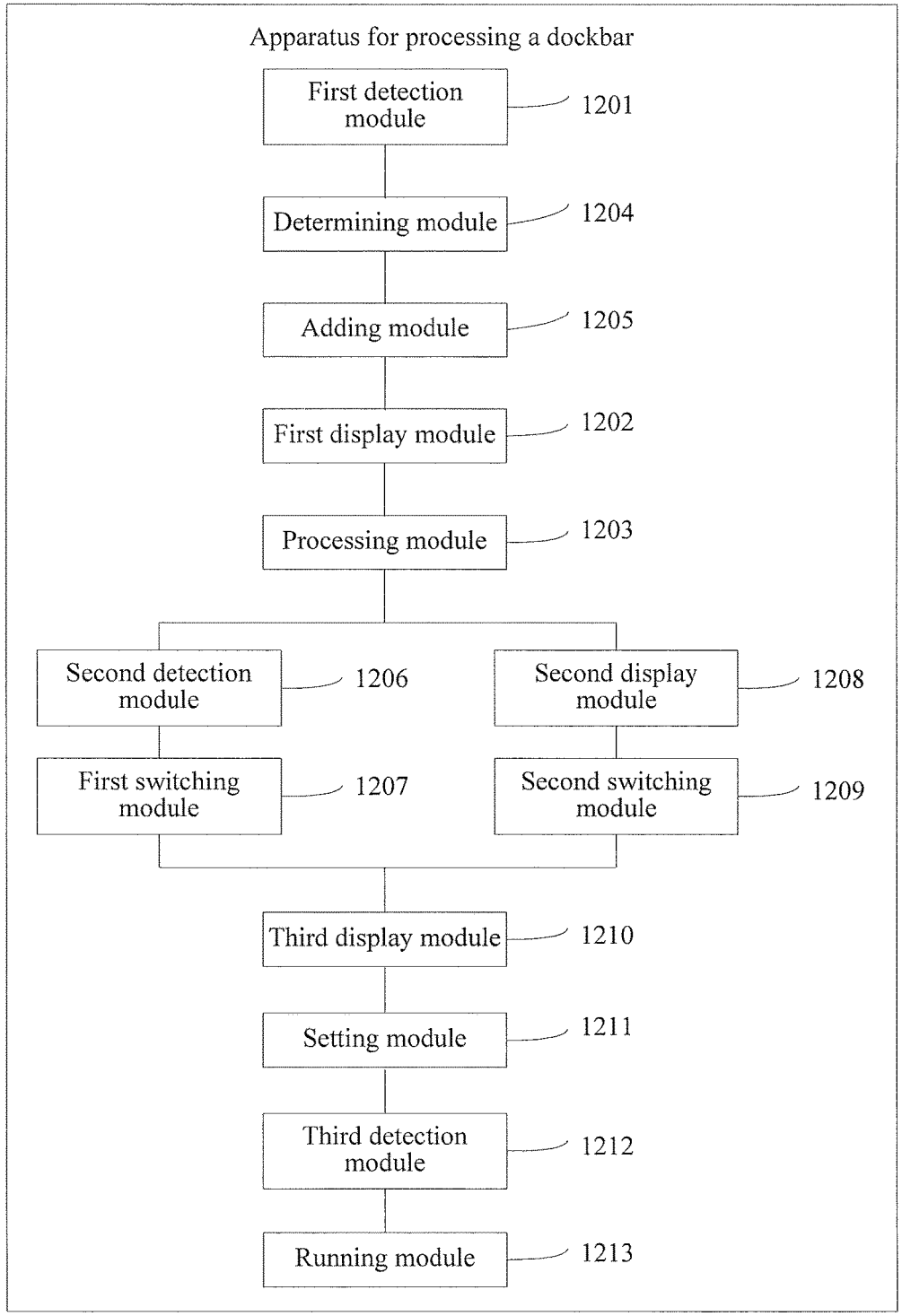
FIG. 17 is a schematic structural diagram of a sixth apparatus for processing a dockbar according to still another embodiment of the present disclosure.

Further, referring to FIG. 17, apart from including the first detection module 1201, the first display module 1202, the processing module 1203, the determining module 1204, the adding module 1205, the second detection module 1206, the first switching module 1207, the second display module 1208, the second switching module 1209, the third display module 1210, and the setting module 1211, the plurality of program modules further include:

a third detection module 1212, configured to detect an operation of tapping an icon on the dockbar; and a running module 1213, configured to directly run an application program corresponding to the tapped icon detected by the third detection module 1212.

It should be noted that the third detection module 1212 and the running module 1213 may be located in front of the first detection module 1201, and may also be located behind the processing module 1203 or the first switching module 1207 or the setting module 1211. FIG. 17 merely provides a possible implementation manner, and this embodiment does not specifically limit locations of the third detection module 1212 and the running module 1213.

Figure 18:
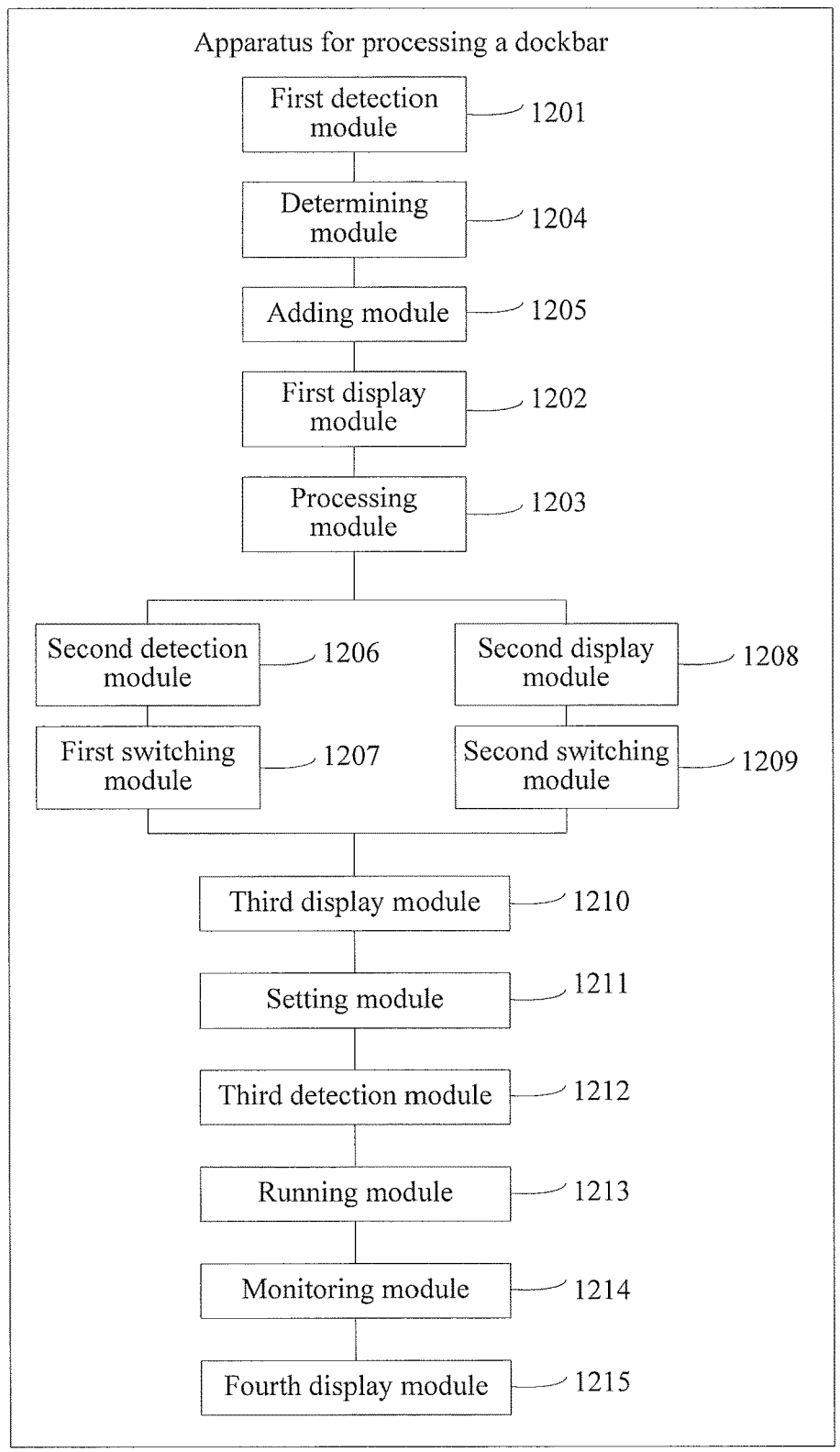
FIG. 18 is a schematic structural diagram of a seventh apparatus for processing a dockbar according to still another embodiment of the present disclosure.

Further, referring to FIG. 18, apart from including the first detection module 1201, the first display module 1202, the processing module 1203, the determining module 1204, the adding module 1205, the second detection module 1206, the first switching module 1207, the second display module 1208, the second switching module 1209, the third display module 1210, the setting module 1211, the third detection module 1212, and the running module 1213, the plurality of program modules further include:

a monitoring module 1214, configured to monitor a state of the application program corresponding to the icon on the dockbar; and a fourth display module 1215, configured to display the state of the application program monitored by the monitoring module 1214 by using the icon corresponding to the application program.

It should be noted that the monitoring module 1214 and the fourth display module 1215 may be located in front of the first detection module 1201, and may also be located behind the processing module 1203 or the first switching module 1207 or the setting module 1211. FIG. 18 merely provides a possible implementation manner, and this embodiment does not specifically limit locations of the monitoring module 1214 and the fourth display module 1215.

Therefore, in the apparatus for processing a dockbar according to this embodiment of the present disclosure, after the number of icons on a current screen dockbar reaches a preset number, a next screen dockbar with the number of icons that does not reach the preset number is displayed, and a dragged icon is placed on the next screen dockbar with the number of icons that does not reach the preset number, thereby increasing the number of icons placed on a dockbar. Moreover, a setting option of the dockbar is displayed, which helps a user perform user-defined setting on the dockbar, and may further enrich beautification effects of the dockbar. Further, after an operation of tapping an icon is detected, an application program corresponding to the tapped icon is directly run, so that functions corresponding to the application program can be rapidly implemented, which is convenient and quick.

It should be noted that the above functional modules are only described for exemplary purposes when the apparatus for processing a dockbar provided by the foregoing embodiment processes a dockbar. In actual applications, the functions may be allocated to and implemented by different functional modules as required, which means that the internal structure of the apparatus is divided into different functional modules to complete all or some of the above described functions. In addition, the apparatus for processing a dockbar that is provided by the foregoing embodiments is based on the same concept as the method for processing a dockbar in the foregoing embodiments. For the specific implementation process, refer to the method embodiments, and the details are not described herein again.

An embodiment of the present disclosure further provides a non-transitory computer-readable storage medium containing one or more computer executable instructions, where the computer executable instruction is used for executing a method for processing a dockbar when executed by a computer processor, and the method includes:

detecting an operation of dragging an icon to a current screen dockbar, the icon being an icon of an application program or an icon of a folder;

determining whether the number of icons placed on the current screen dockbar reaches a preset number; and displaying a next screen dockbar with the number of icons that does not reach a preset number, and placing the dragged icon on the next screen dockbar if the number of icons on the current screen dockbar reaches the preset number.

The next screen dockbar is a newly-established screen dockbar, or the next screen dockbar is an established screen dockbar with the number of icons that does not reach the preset number.

The sequence numbers of the foregoing embodiments of the present disclosure are merely for the convenience of description, and do not imply the preference among the embodiments.

Based on the foregoing descriptions about the embodiments, a person skilled in the art may clearly understand that the present disclosure may be implemented by using a manner of software in addition to necessary universal hardware, and certainly may also be implemented by hardware. However, software program implementation is a better implementation manner in most cases. Based on such an understanding, the technical solutions of the present disclosure essentially, or the part contributing to the existing technology may be implemented in a form of a software product. The computer software product may be stored in a computer readable storage medium such as a floppy disk of a computer, a ROM (read-only memory), a RAM (random access memory), a flash, a magnetic disk, an optical disc, or the like, and includes several instructions for instructing a computer device (which may be a personal computer, a server, a network device, or the like) to perform the methods described in the embodiments of the present disclosure.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for processing dockbars, comprising:
at a mobile terminal having one or more processors, a touchscreen, and memory for storing a plurality of program modules to be executed by the one or more processors:
    displaying, via the touchscreen, a home screen that consists of an area and a first dockbar distinct from and adjacent to the area, wherein the area includes one or more first application icons and the first dockbar includes one or more second application icons different from the one or more first application icons, the first and second application icons being independently operable by a user of the mobile terminal, and further wherein the user of the mobile terminal can select any one of the first and second application icons to run an application program associated with the user-selected application icon while the first and second application icons are displayed on the home screen;
    detecting user interaction with the touchscreen of dragging an icon from the area to the first dockbar, wherein: (i) the user-dragged icon is an application icon of an application program; and (ii) the user-dragged icon is one of the one or more first application icons;
    in response to the detecting, determining whether a number of icons in the one or more second application icons displayed in the first dockbar reaches a preset number; and
    in accordance with a determination that the number of icons in the one or more second application icons displayed in the first dockbar reaches the preset number:
        replacing the display of the first dockbar with a second dockbar, distinct from the first dockbar, while keeping the area in the home screen, wherein the second dockbar has a number of icons that does not reach the preset number; and
        moving the user-dragged icon from the area into the second dockbar and appending the user-dragged icon to the right end of pre-existing application icons in the second dockbar.

2. The method according to claim 1, wherein the second dockbar is newly established when the numbers of icons placed on established screen dockbars, including the first dockbar, all reach the preset number.

3. The method according to claim 1, further comprising:
detecting a swipe action on the second dockbar on the touchscreen;
in response to detecting the swipe action:
    replacing the display of the second dockbar with the first dockbar or a third dockbar, according to a swipe direction of the swipe action without affecting icons displayed in the area.

4. The method according to claim 1, further comprising:
displaying, via the touchscreen, first and second graphic identifiers in the home screen corresponding to the first and second dockbars, respectively; and
after detecting a user selection of the first graphic identifier corresponding to the first dockbar:
    replacing the display of the second dockbar with the first dockbar while keeping the area in the home screen.

5. The method according to claim 1, further comprising:
displaying a setting option for the first and second dockbars, and
setting the first and second dockbars according to a setting option chosen by a user after the setting option chosen by the user is received,
wherein the setting option of the first and second dockbars comprises at least one of options of setting a size, transparency, and a background of each dockbar, the number of application icons placed on the dockbar, an icon size, and an effect.

6. The method according to claim 1, further comprising:
detecting a subsequent user interaction with the home screen of tapping an application icon displayed in the second dockbar, and
directly running an application program corresponding to the tapped icon.

7. The method according to claim 1, further comprising:
monitoring a state of the application program corresponding to the user-dragged icon on the second dockbar; and
displaying the state of the application program by using the user-dragged icon corresponding to the application program.

8. A mobile terminal for processing dockbars, comprising:
one or more processors;
a touchscreen;

memory; and a plurality of program modules stored in the memory and to be executed by the one or more processors, the plurality of program modules further including:

while displaying, via the touchscreen, a home screen that consists of an area and a first dockbar distinct from and adjacent to the area, wherein the area includes one or more first application icons and the first dockbar includes one or more second application icons different from the one or more first application icons displayed in the area, the first and second application icons being independently operable by a user of the mobile terminal, a first detection module configured to detect user interaction with the touchscreen of dragging an icon from the area to the first dockbar, wherein: (i) the user-dragged icon is an icon of an application program; and (ii) the user-dragged icon is one of the one or more first application icons, and further wherein the user of the mobile terminal can select any one of the first and second application icons to run an application program associated with the user-selected application icon while the first and second application icons are displayed on the home screen;

a determining module, in response to the detecting, configured to determine whether a number of icons in the one or more second application icons displayed in the first dockbar reaches a preset number;

a first display module, in accordance with a determination that the number of icons in the one or more second application icons displayed in the first dockbar reaches the preset number, configured to replace the display of the first dockbar with a second dockbar, distinct from the first dockbar, while keeping the area in the home screen, wherein the second dockbar has a number of icons that does not reach the preset number; and a processing module configured to move the user-dragged icon detected by the first detection module from the area into the second dockbar displayed by the first display module and appending the user-dragged icon to the right end of pre-existing application icons in the second dockbar.

9. The mobile terminal according to claim 8, wherein the plurality of program modules further comprises:

an adding module configured to establish the second dockbar when the determining module determines that the numbers of icons placed on established screen dockbars, including the first dockbar, all reach the preset number.

10. The mobile terminal according to claim 8, wherein the plurality of program modules further comprises:

a second detection module configured to detect a swipe action on the second dockbar on the touchscreen; and a first switching module configured to replace the display of the second dockbar with the first dockbar or a third dockbar according to a swipe direction of the swipe action detected by the second detection module without affecting icons displayed in the area.

11. The mobile terminal according to claim 8, wherein the plurality of program modules further comprises:

a second display module configured to display first and second graphic identifiers in the home screen corresponding to the first and second dockbars, respectively; and a second switching module configured to, after detecting a user selection of the first graphic identifier displayed by the second display module and corresponding to the first dockbar:

replace the display of the second dockbar with the first dockbar while keeping the area in the home screen and any icons therein.

12. The mobile terminal according to claim 8, wherein the plurality of program modules further comprises:

a third display module configured to display a setting option for the first and second dockbars; and a setting module configured to set the first and second dockbars according to a setting option chosen by a user after the setting option chosen by the user is received, wherein the setting option of the first and second dockbars comprises at least one of options of setting a size, transparency, and a background of each dockbar, the number of application icons placed on the dockbar, an icon size, and an effect.

13. The mobile terminal according to claim 8, wherein the plurality of program modules further comprises:

a third detection module configured to detect a user selection of an application icon on the second dockbar on the touchscreen; and a running module configured to directly run an application program corresponding to the user-selected icon.

14. The mobile terminal according to claim 8, wherein the plurality of program modules further comprises:

a monitoring module configured to monitor a state of the application program corresponding to the user-dragged icon on the second dockbar; and a fourth display module configured to display the state of the application program monitored by the monitoring module by using the user-dragged icon corresponding to the application program.

15. A non-transitory computer-readable storage medium containing one or more computer executable instructions, the computer executable instructions being executed by one or more processors of a mobile terminal having a touchscreen to perform one or more steps including:

displaying, via the touchscreen, a home screen that consists of an area and a first dockbar distinct from and adjacent to the area, wherein the area includes one or more first application icons and the first dockbar includes one or more second application icons different from the one or more first application icons displayed in the area, the first and second application icons being independently operable by a user of the mobile terminal, and further wherein the user of the mobile terminal can select any one of the first and second application icons to run an application program associated with the user-selected application icon while the first and second application icons are displayed on the home screen;

detecting user interaction with the touchscreen of dragging an icon from the area to the first dockbar, wherein: (i) the user-dragged icon is an application icon of an application program; and (ii) the user-dragged icon is one of the one or more first application icons;

in response to the detecting, determining whether a number of icons in the one or more second application icons displayed in the first dockbar reaches a preset number; and in accordance with a determination that the number of icons in the one or more second application icons displayed in the first dockbar reaches the preset number:

replacing the display of the first dockbar with a second dockbar, distinct from the first dockbar, while keeping the area in the home screen, wherein the second dockbar has a number of icons that does not reach the preset number; and placing moving the user-dragged icon from the area into the second dockbar and appending the user-dragged icon to the right end of pre-existing application icons in the second dockbar.

16. The non-transitory computer-readable storage medium according to claim 15, wherein the second dockbar is newly established when the numbers of icons placed on established screen dockbars, including the first dockbar, all reach the preset number.

17. The non-transitory computer-readable storage medium according to claim 15, wherein the one or more steps further include:

detecting a swipe action on the second dockbar on the touchscreen;

in response to detecting the swipe action:

replacing the display of the second dockbar with the first dockbar or a third dockbar, according to a swipe direction of the swipe action without affecting icons displayed in the area.

18. The non-transitory computer-readable storage medium according to claim 15, wherein the one or more steps further include:

displaying, via the touchscreen, first and second graphic identifiers in the home screen corresponding to the first and second dockbars, respectively; and after detecting a user selection of the first graphic identifier corresponding to the first dockbar:

replacing the display of the second dockbar with the first dockbar while keeping the area in the home screen.

19. The non-transitory computer-readable storage medium according to claim 15, wherein the one or more steps further include:

displaying a setting option for the first and second dockbars, and setting the first and second dockbars according to a setting option chosen by a user after the setting option chosen by the user is received, wherein the setting option of the first and second dockbars comprises at least one of options of setting a size, transparency, and a background of each dockbar, the number of application icons placed on the dockbar, an icon size, and an effect.

20. The non-transitory computer-readable storage medium according to claim 15, wherein the one or more steps further include:

monitoring a state of the application program corresponding to the user-dragged icon on the second dockbar; and displaying the state of the application program by using the user-dragged icon corresponding to the application program.

* * * * *